United States Patent
Mehra et al.

(10) Patent No.: US 10,664,346 B2
(45) Date of Patent: May 26, 2020

(54) PARITY LOG WITH BY-PASS

(71) Applicant: Microsoft Technology Licensing, LLC, Redmond, WA (US)

(72) Inventors: Karan Mehra, Sammamish, WA (US); Sachin Patel, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 15/984,135

(22) Filed: May 18, 2018

(65) Prior Publication Data
US 2019/0354433 A1    Nov. 21, 2019

(51) Int. Cl.
*G06F 11/00* (2006.01)
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| 9,946,607 | B2 * | 4/2018 | Sundararaman | G06F 11/1458 |
| 2008/0155190 | A1 * | 6/2008 | Ash | G06F 12/0871 |
| | | | | 711/114 |
| 2008/0276124 | A1 * | 11/2008 | Hetzler | G06F 11/1076 |
| | | | | 714/6.13 |
| 2011/0197024 | A1 * | 8/2011 | Thomas | G06F 11/2094 |
| | | | | 711/114 |
| 2012/0011314 | A1 * | 1/2012 | Yochai | G06F 1/3268 |
| | | | | 711/113 |
| 2013/0326149 | A1 * | 12/2013 | Barrell | G06F 12/0891 |
| | | | | 711/135 |
| 2015/0205669 | A1 * | 7/2015 | Sundaram | G06F 16/1847 |
| | | | | 714/6.23 |
| 2017/0277450 | A1 | 9/2017 | Ish et al. | |

OTHER PUBLICATIONS

S. Im and D. Shin, "Flash-Aware RAID Techniques for Dependable and High-Performance Flash Memory SSD," in IEEE Transactions on Computers, vol. 60, No. 1, pp. 80-92, Jan. 2011.doi: 10.1109/TC.2010.197 (Year: 2011).*
"International Search Report and Written Opinion Issued in PCT Application No. PCT/US2019/030790", dated Jul. 19, 2019, 11 Pages.

* cited by examiner

*Primary Examiner* — Daniel F. McMahon
(74) *Attorney, Agent, or Firm* — Newport IP, LLC; Michael C. Johnson; Han Gim

(57) ABSTRACT

In a parity-based redundancy scheme, allocation information indicative of free and allocated portions of storage is accessed. In response to a request for a write operation, when the write request shares its parity with a non-free portion of the storage, a record of writes to the storage is updated to include the requested write and associated parity. The parity is updated with the requested write, and the write request is executed. When the write request shares its parity with a free portion of the storage or the write request spans all portions of storage that shares the parity, the write request is allowed to be executed in the free portion of the storage without updating the record.

17 Claims, 9 Drawing Sheets

PARITY LOG WITH BY-PASS

BACKGROUND

Computer systems typically utilize some type of non-volatile data storage. For example, computer systems may have multiple storage devices, such as one or more hard drives, solid state drives, etc. When multiple storage devices are used, they can be arranged in various ways to provide certain levels of resiliency. Data storage devices are susceptible to physical failures, and fault tolerant techniques can be employed to avoid or minimize the impact of such failures.

In some examples, physical disk drive components may be combined into one or more logical units to provide data redundancy and performance improvement. Data may also be distributed across the drives depending on the desired level of redundancy, performance, reliability, availability, and capacity. Different levels of resiliency can be achieved, for example, by different mirroring schemes or parity schemes.

Mirroring is the replication of logical disk volumes onto separate physical hard disks to provide redundancy. A mirrored volume is a logical representation of separate volume copies. Resiliency can be achieved by a mirroring scheme that maintains two copies of data, where the different copies are on one or more different device arrangements. More resiliency can be achieved by having three copies of data on three different device arrangements. The first example can tolerate a single device failure while the second example could tolerate two device failures.

Alternatively, various parity schemes, can be used to achieve resiliency. In some examples, a parity drive may be implemented to provide resilience/redundancy. One way to implement parity is to use the exclusive (XOR) function. In such an implementation, the XOR may be performed for data to be backed, and the XOR may be written to the parity drive/volume. If a drive fails, the XOR of the remaining drive and the parity drive can be taken to recover the data on the failed drive. Parity schemes use less disk space than triple mirroring schemes, but may have lower levels of performance because of the need to perform the parity function, as well as other administrative tasks.

It is with respect to these and other considerations that the disclosure made herein is presented. The subject matter claimed herein is not limited to embodiments that solve any disadvantages or that operate only in environments such as those described above. Rather, this background is only provided to illustrate one exemplary technology area where some embodiments described herein may be practiced.

SUMMARY

It is desirable to provide the highest level of stored data resiliency for handling faults such as power interruptions, while at the same time providing performance and minimizing cost. Two examples of a backup mechanism that provide resiliency are a mirroring scheme and a parity scheme. While a mirroring scheme may provide high resiliency, the typical implementation of providing at least two backups may result in higher cost. Parity schemes may decrease the amount of storage that is needed, but may be subject to less resiliency depending on when the fault occurs.

One way to provide improved redundancy and resiliency while lowering cost is to implement a parity scheme coupled with a log or register. A redundancy/resiliency scheme may be implemented to protect against the "read and write hole" issue that generally refers to mismatches in revision level between user data and parity data due to a lack of atomicity, thereby creating a "hole" that has to be resynchronized before the data can be returned. Such a hole may result, for example, from a power failure that occurs during a write operation before the write operation is committed. For example, a write hole may result if, during a write to memory, a power fail event places the parity data out of sync with the data.

One way to guard against the write hole problem is to maintain a log or journal to record intended writes before proceeding with the write. In an embodiment, the intended write is committed and recorded (typically by flushing the working cache), in the journal before proceeding with recording the parity data. The journal entry now contains the information needed to simply replay the write if a power fail event occurs during the write operation to the memory. In other words, when a power failure occurs, the journal contains the information needed to retry the write if not all of the write data and parity data have been successfully transferred to persistent memory. Thus if a power failure occurs before the parity is computed, the parity cache state information will reflect the information that is needed to recover the last intended action. This information may be used to re-start the process of parity computation for the data.

In an embodiment, when an application sends a request to write data to storage, the write request is redirected to a journal so that the data write request can be logged. The journal is logged before the data is allowed to be written and backed by a parity function. Once the entry to the journal is persistently stored, the data may be written and backed by the parity function. After successfully writing the data and storing the updated parity data, the journal entry may optionally be evicted from the journal since there is no more need to preserve information for the pending write. Because the journal records all writes to parity, consistency can be maintained when a power failure or interruption occurs at any point during the parity backup process.

One drawback of using the journal is the performance impact that may be incurred due to logging each write to the journal. The present disclosure describes ways to provide the resiliency of implementing the journal approach for parity backups, with greater efficiency and improved performance. In one embodiment, not all writes are recorded in the journal. That is, some writes may be allowed to proceed and bypass recording the write and parity information in the journal.

In an embodiment, information describing the free and allocated storage space of the computing device may be obtained. In some embodiments, the free and allocated storage space information may be obtained initially from the file system. The journal may then maintain a log of the storage space allocated and free information as data is written and when space is freed. In one embodiment, the allocated and free information may be saved in bitmap form. The bitmap can be maintained at various levels of resolution such as a sector of memory.

When a write request is received, the bitmap may be accessed to determine if the data write will be paired with a free or allocated portion of memory when generating the parity backup. If the data write will be paired with an allocated portion of memory when generating the parity backup, then the journal may be updated. If the data write will be paired with a free portion of memory when generating the parity backup, then the journal may be bypassed. When the data write will be paired with a free portion of memory when generating the parity backup, the data will be XOR'ed with free space (i.e., zeroes), resulting in the output being the same as the new data to be written. Therefore there is no parity data dependency and thus no need to record the write information in order to replay the write. In this way, the costs of delaying the data write to store the intended write to the journal can be avoided.

By bypassing the journal in the situations described herein, improvements to data integrity and security may be provided in a way that reduces the amount of storage space needed, and further reducing the cost of providing the improvements in terms of latency and processing resources.

As the journal continues to be updated with free/allocated information and the size of the bitmap grows, the bitmap can take grow to a size such that maintaining and updating the bitmap may become a significant drain on resources. The process of updating and saving the bitmap for every updated free/allocated status can be costly when the size of the bitmap covers a large storage area. For example, if a volume has a capacity of 100 terabytes, the free/allocated bitmap can be significant. However, at any given time, the amount of data that is changing may be a small portion of the total capacity. Therefore each change is relatively small compared to the full bitmap.

In an embodiment, the entire bitmap is not updated for every update. In one embodiment, delta bitmaps are maintained that track changes since the previous stored bitmap or previous record of changes. In an embodiment, when a pending change is made to a stored bitmap, the bitmap may be XOR'ed with the pending change, and the result will include have 1's where the changes were made. The delta may be readily compressed, for example, by storing the numbers of 0's and 1's and their order. These changes may be accumulated, and later concatenated to generate the full updated bitmap.

In some embodiments, a full bitmap may be generated periodically or in response to predetermined events, which may include a threshold number of deltas, a percentage of the journal size or capacity, a fixed amount of space that may be predetermined, a shutdown or other event of the computing device, and upon request by the computing device, user, or other entity.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
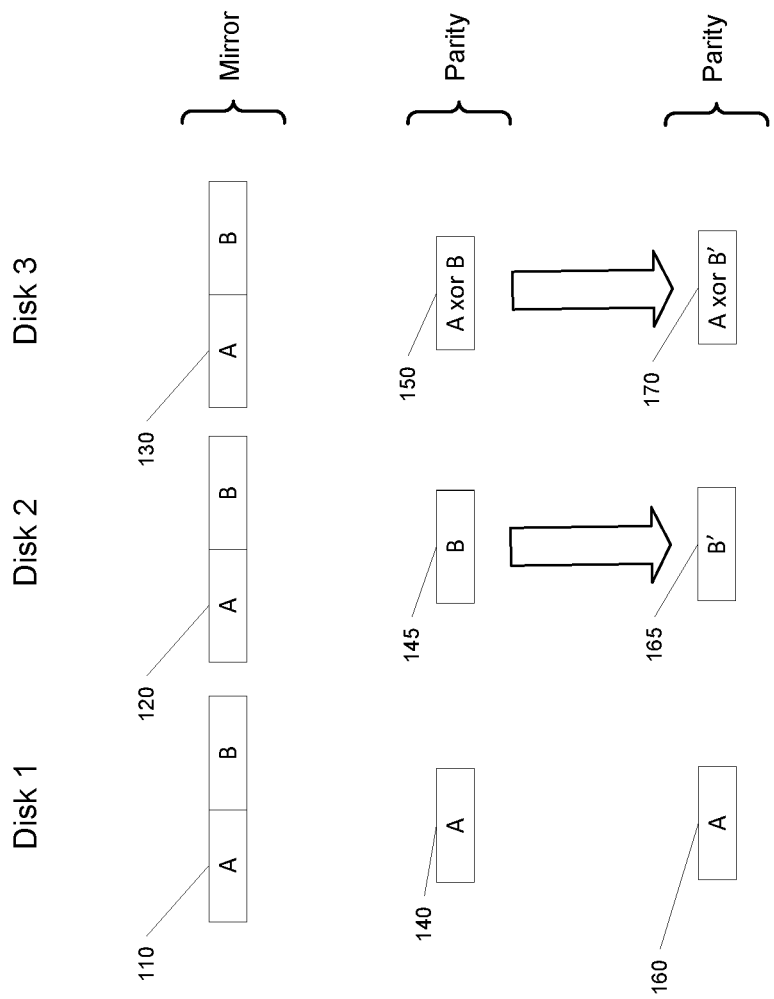
FIG. 1 is a diagram illustrating example backup schemes.

The techniques disclosed herein provide for improvements in the implementation of data backup and recovery schemes such as parity backups. The improvements include improved data integrity and security, as well as reduction in storage and processing resources. Many users want the highest level of resiliency when backing up their data, while at the same time providing performance and minimizing cost. Referring to FIG. 1, illustrated are examples of a mirroring scheme and a parity scheme which may be implemented to provide resilient data backups. Two data blocks A and B are shown initially as data group 110 that may be stored on disk 1. For mirroring with two backups, data blocks A and B are shown replicated as data groups 120 and 130 on disk 2 and disk 3, respectively. In a parity scheme, data blocks A 140 and B 145 are shown on disks 1 and 2, and backed by XOR'ing the data and saved as parity 150. When data B is updated to data B', then the parity is updated by XOR'ing the updated data B and stored as updated parity data 170. As can be seen, depending on when a power interruption occurs during the process, there exists a potential for loss of synchronization between the intended writes and the actual written data. It should be noted that the described examples may be implemented in a variety of applicable parity schemes and are not limited to the specific examples described herein. For example, both RAID5 and RAID6 are example scenarios where the described embodiments may be implemented.

One way to provide redundancy and resiliency guarantees while lowering cost is to implement a parity scheme with a log, journal, or register. The log, journal, or register, which may be referred to herein interchangeably, may be a data structure that is operable to store a record of data writes and associated parity information, as well as other information as discussed further herein. When implementing a redundancy/resiliency scheme, one issue that can be addressed is the "read and write hole" problem. The read and write hole problem generally refers to mismatches in revision level between user data and parity data due to a lack of atomicity, thereby creating a "hole" that must be resynchronized before the stored data can be returned and used. Such a hole may result from a power failure that occurs during a write operation before the write operation is committed. For example, a write hole may result if, during a write to memory, a power failure event places the parity data out of sync with the data. In the mirror model, depending on when the power failure occurs, loss of synchronization can occur when not all redundant backups have been committed and there is ambiguity as to which version of data is the latest. In the parity model, if a power interruption occurs during update of the parity data, the ability to recover data may be lost if the parity data has been corrupted. For example, referring to FIG. 1, if data B in data block 140 is in the process of being updated to B', and A is stable and a parity backup A XOR B is already stored, then the act of updating the parity data A XOR B', if interrupted, may compromise the ability to recover A.

One way to guard against the write hole issue is to implement a log or journal to record intended writes before proceeding with the write. A log or journal may be any data structure that is operable to store write information and parity information. In an embodiment, the intended write may be committed and persisted (typically by flushing the working cache) in the journal before proceeding with recording the parity data. The journal entry now contains the information needed to simply replay the write if a power failure event occurs during the write operation to the storage disk. In other words, when a power failure occurs, the journal contains the information needed to retry the write if not all of the write data and parity data have been successfully transferred to persistent memory. Thus if a power failure occurs before the parity is computed, the parity cache state information will reflect the originally intended action. This information may be used to re-start the process of parity computation for the data.

Figure 2:
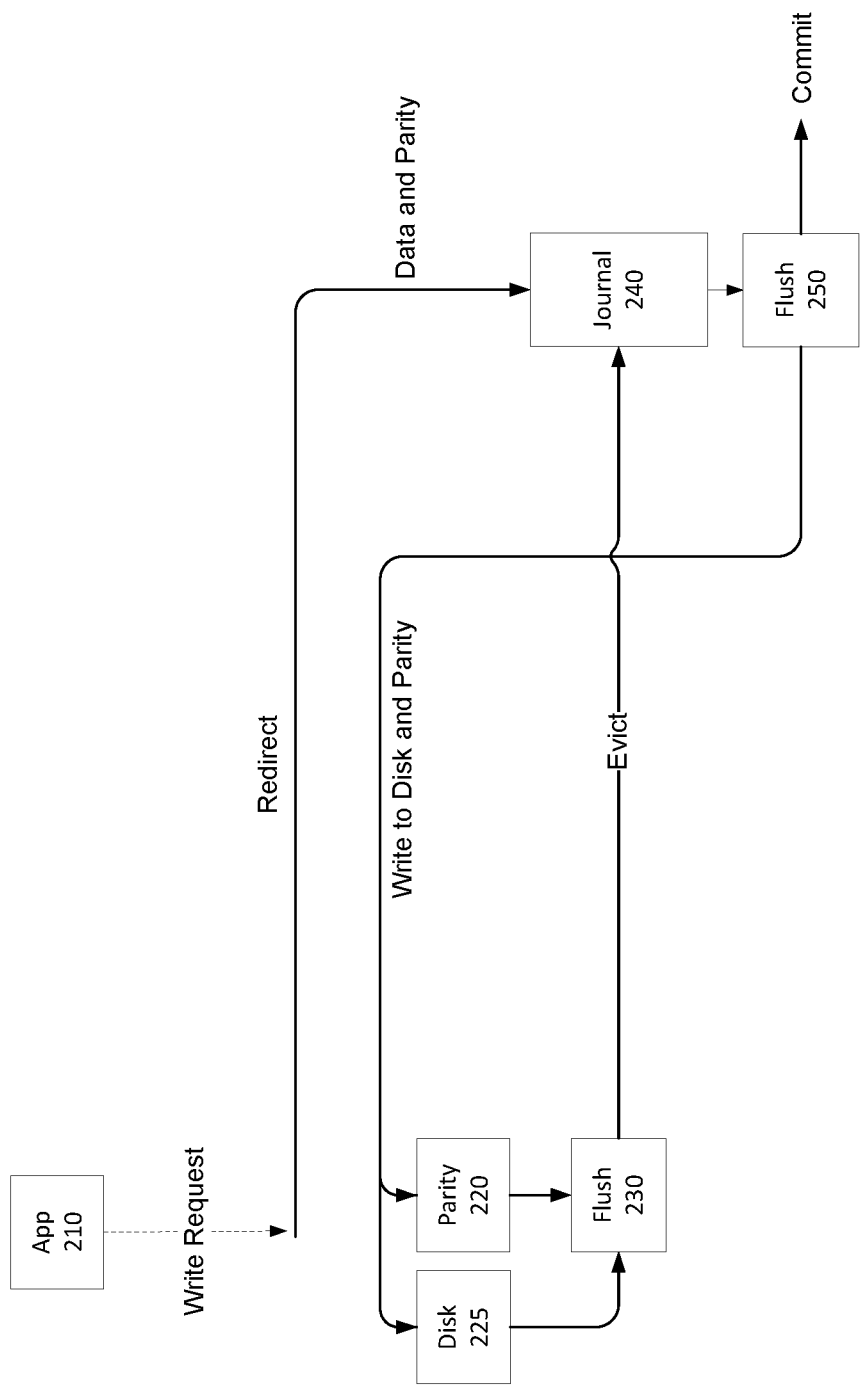
FIG. 2 is a diagram illustrating an example of a parity journal, according to the described implementations.

Referring to FIG. 2, illustrated is an example of the use of a log or journal to provide resiliency to power failures. Illustrated is an application 210 that sends a request to write data to storage. Before the data is allowed to be written to disk 225 and backed by parity 220, the write request is redirected to journal 240 so that the data write request and associated parity can be logged. Once the entry to the journal is flushed 250 (the transfer of data from a temporary storage area to permanent memory), the data is written to disk 225 and backed by parity 220. After successfully recording the data associated parity data, the journal entry may optionally be evicted from the journal since there is no more need to preserve information for the pending write. Because the journal records all writes to parity, consistency can be maintained when a power failure or interruption occurs at any point during the parity backup process.

One drawback of implementing the journal is the performance impact that may be incurred due to logging each write to the journal. The present disclosure describes ways to provide the resiliency that is enabled by implementing the journal approach for parity backups, with greater efficiency and improved performance. In one embodiment, not all writes are recorded in the journal. That is, some writes may be allowed to proceed and bypass the journal.

In an embodiment, information describing the free and allocated storage space of the computing device may be obtained. In some embodiments, the free and allocated storage space information may be obtained initially from the file system. The journal may then maintain a log of the storage space allocated and free information as data is written and when space is freed. In one embodiment, the allocated and free information may be saved in bitmap form. The bitmap can be maintained at various levels of resolution such as a sector of memory.

When a write request is received, the bitmap may be accessed to determine if the data write will be paired with a free or allocated portion of memory when generating the parity backup. If the data write will be paired with an allocated portion of memory when generating the parity backup, then the journal may be updated. If the data write will be paired with a free portion of memory when generating the parity backup, then the journal may be bypassed. Since the data write will be paired with a free portion of memory when generating the parity backup, the data will be XOR'ed with free space (i.e., zeroes), resulting in the output being the same as the new data to be written. Since there is no information that will be lost if this XOR result is not saved, the journal need not store this information for the purposes of providing a parity backup.

Figure 3A:
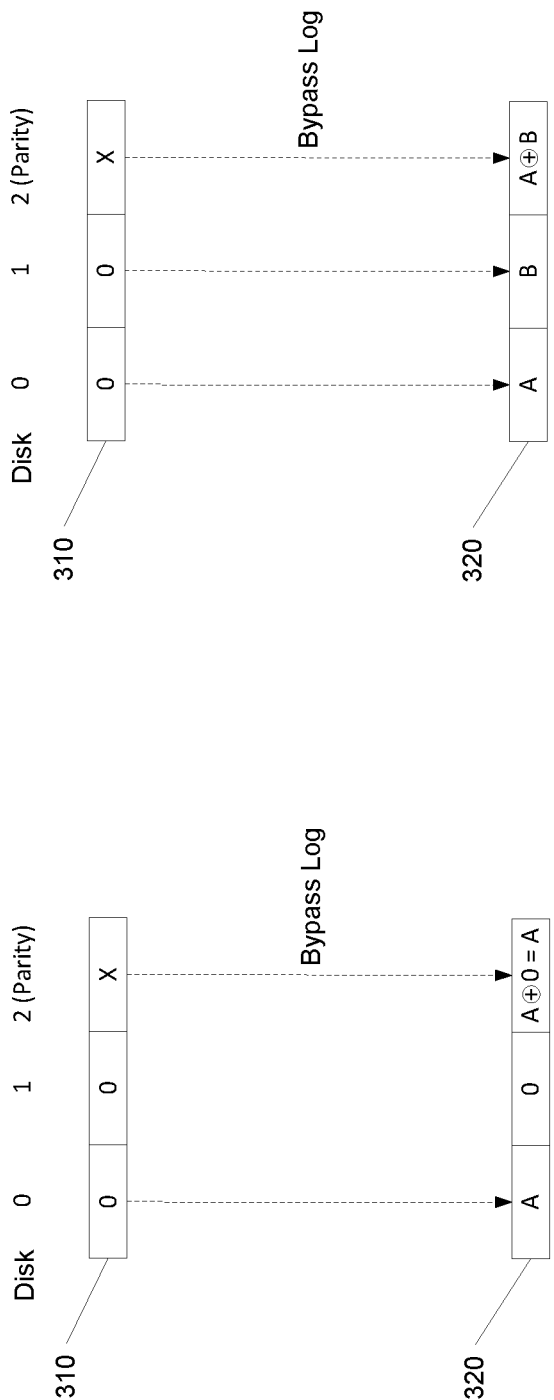
FIG. 3A is a diagram illustrating an example of updating or bypassing the parity journal, according to the described implementations.

Referring to FIG. 3A, illustrated is an example of bypassing the parity journal. Data blocks 310 on disks 0, 1, and 2 are shown as unallocated (free). When data A is written to disk 0 as shown in data blocks 320, and the corresponding parity pair on disk 1 is still free, then there is no dependency on the data A for recovery of what is in disk 1, and therefore the journal 350 can be bypassed. Referring again to FIG. 3A, illustrated is another example of bypassing the parity journal. Data blocks 310 on disks 0, 1, and 2 are shown as unallocated (free). When data A is written to disk 0 and data B is written to disk 1 as shown in data blocks 320, and the corresponding parity pair on disk 1 is still free, then there is no dependency on the data A or data B for recovery of what is in disk 1 since both A and B are being written for the first time, and therefore the journal 350 can be bypassed. In these embodiments, the journal can be bypassed if there is no compromise to the recovery of any stable data. In other words, if new data is to be written, and if it doesn't share its parity with any other data that already is stored and requires possible recovery, then journal can be bypassed. In this way, the costs of delaying the data write to store the intended write to the journal can be avoided.

Figure 3B:
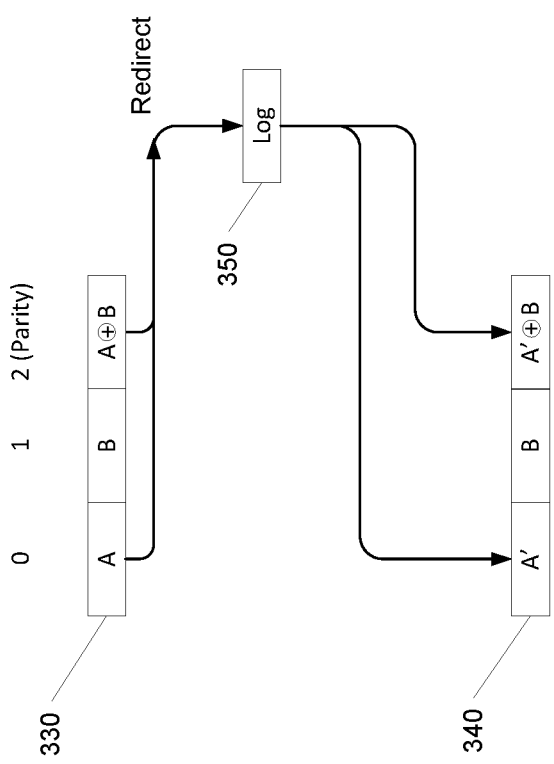
FIG. 3B is a diagram illustrating an example of updated or bypassing the parity journal, according to the described implementations.

Referring to FIG. 3B, illustrated is an example where the parity journal is not bypassed. Data blocks 330 on disks 0, 1, and 2 are shown as having data A, data B, and parity A XOR B. When data A is updated on disk 0 as shown in data blocks 340, then the intended updated to data A is recorded in journal 350. The updated parity A' XOR B is also written to journal 350. After recording both the write and the updated parity in journal 350, then disks 0 and 2 are updated as shown in data blocks 340. The journal is not bypassed because of the dependency that data B has on the shared parity with A when A is updated to A'.

Figure 4:
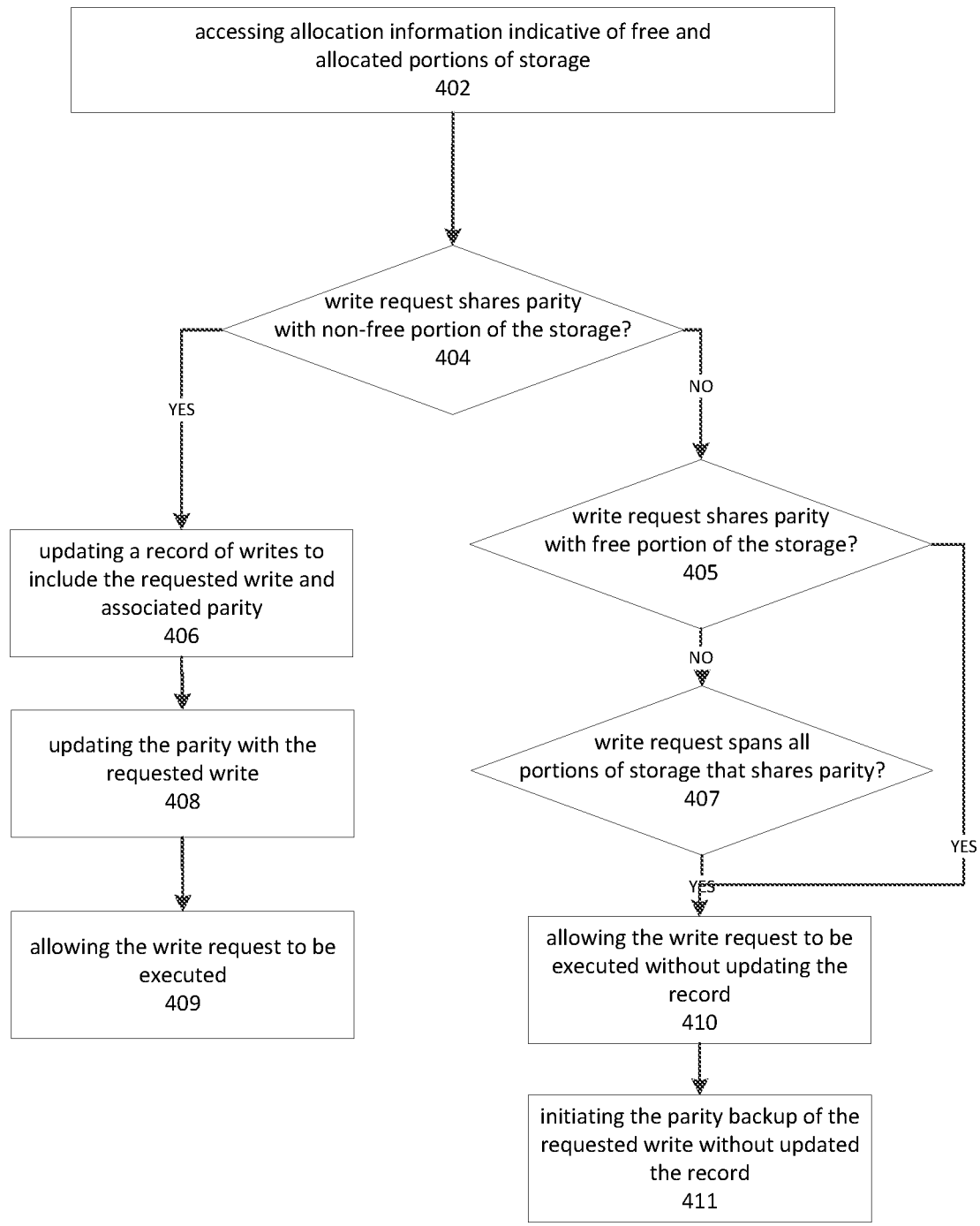
FIG. 4 is a diagram illustrating an example operational procedure, according to the described implementations.

Referring to FIG. 4 is an example process for determining if a write can be performed without saving the write to the journal. Operation 402 illustrates accessing allocation information indicative of free and allocated portions of storage. Operation 404 illustrates determining whether the write request shares its parity with a non-free portion of the storage. If the write request shares its parity backup with a non-free portion of the storage, then operation 404 may be followed by operation 406. Operation 406 illustrates updating a record of writes to the storage to include the requested write and associated parity. Operation 406 may be followed by operation 408. Operation 408 illustrates updating the parity with the requested write. Operation 408 may be followed by operation 409. Operation 409 illustrates allowing the write request to be executed.

If the write request shares its parity with a free portion of the storage, then operation 404 may be followed by operation 405. Operation 405 illustrates determining if the write request shares its parity with a free portion of the storage. If the write request shares its parity with a free portion of the storage, then operation 405 may be followed by operation 410. If the write request does not share its parity with a free portion of the storage, then operation 405 may be followed by operation 407. Operation 407 illustrates determining if the write request spans all portions of storage that shares the parity. If the write request spans all portions of storage that shares the parity, then operation 407 may be followed by operation 410.

Operation 410 illustrates allowing the write request to be executed in the free portion of memory without updating the record. Operation 410 may be followed by operation 411. Operation 411 illustrates updating the parity based on the requested write without updating the record. By bypassing the journal in the situations described herein, the journal is only used when necessary to cover a potential loss of data. Pairing with free space allows for bypassing the journal, which avoids the delay in writing data due to the time for the journal to be updated. The bypass thus allows for the benefits of using the journal-backed parity approach, while eliminating some of the overhead. There are a number of situations where free space exists in storage, thus allowing for the journal to be bypassed. For example, when the computing device is relatively new or when a virtual machine has been recently instantiated, there may be fairly large areas of unused and unallocated space. Large areas of free space can also occur when large files such as video files are deleted. In situations where such large areas of free space are paired with data for the purpose of a parity backup, the parity journal may be bypassed. In some embodiments, the storage configuration may be adjusted to increase the likelihood that the journal can be bypassed. For example, in a visualization environment, a group of virtual machines may be load balanced such that each virtual machine is associated with storage volumes that have moderate storage loads.

In some embodiments, both parity and mirroring schemes may be implemented, where some areas are backed using a parity scheme and some areas are backed using a mirroring scheme. By tuning the relative amount used for each approach, a balance may be selected where performance and resiliency are maximized. Initially, data writes can be mirrored, and data from the mirrored area may be moved to a parity-backed area over time.

As the journal continues to update and maintain the bitmap and the size of the bitmap grows, the bitmap can take grow to a size such that maintaining and updating the bitmap becomes a significant drain on resources. The process of updating and saving the bitmap for every updated free/allocated status can be costly when the size of the bitmap continues to grow. For example, if a volume has a capacity of 100 terabytes, the free/allocated bitmap can be many megabytes in size. However, at any given time, the amount of data that is changing may be a small portion of the total capacity. Therefore, each change may be relatively small compared to the full bitmap.

Figure 5:
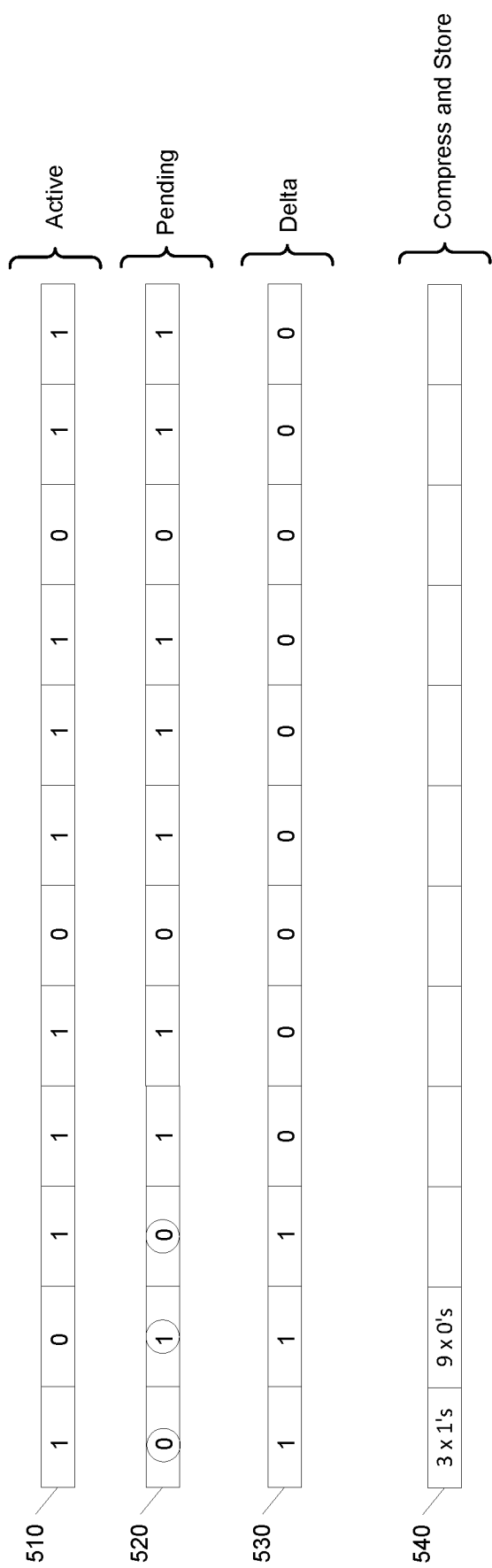
FIG. 5 is a diagram illustrating an example of generation of a delta bitmap, according to the described implementations.

In an embodiment, the entire bitmap is not updated for every update. In one embodiment, delta bitmaps are maintained that track changes since a previously stored bitmap or previous record of changes. Referring to FIG. 5, illustrated is an example implementation where the deltas of a free/allocated bitmap are saved in a parity journal. When a pending change 520 is made to a stored bitmap 510, the stored bitmap 510 may be XOR'ed with the pending change 520. The resulting delta 530 will indicate 1's where the changes were made. The delta 530 may be readily compressed, for example, by storing the numbers of 0's and 1's and their order in the compressed delta 540. These changes may be accumulated, and later concatenated to generate the full updated bitmap.

Figure 6:
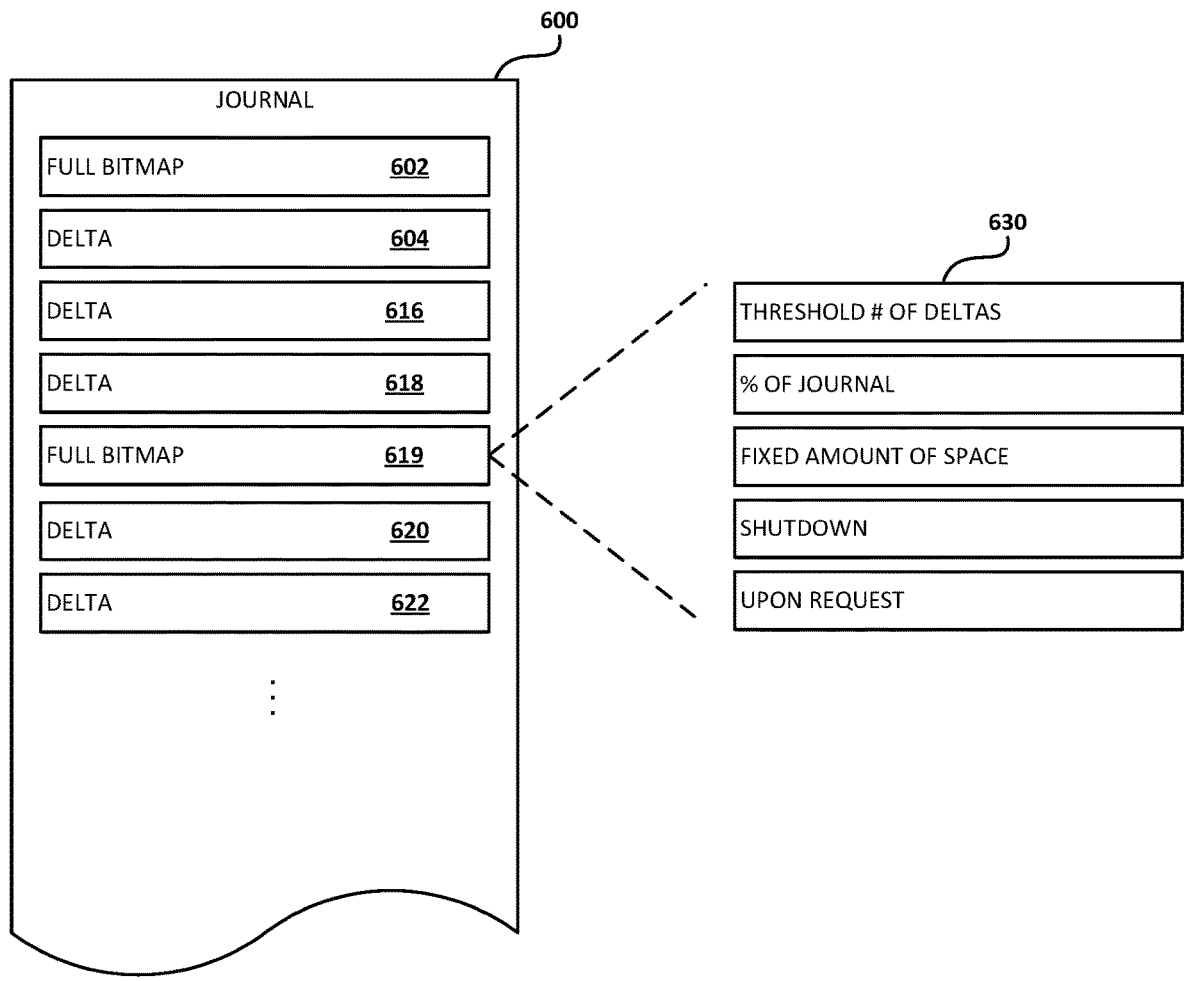
FIG. 6 is a diagram illustrating an example of storing delta bitmaps, according to the described implementations.

Referring to FIG. 6, illustrated is an example of a journal 600 that is operable to store a full bitmap 602. The journal may be implemented as a data structure. It will be appreciated by one skilled in the art that the data structure shown in the figure may represent a data file, a database table, an object stored in a computer storage, a programmatic structure or any other data container commonly known in the art. Each data element included in the data structure may represent one or more fields in a data file, one or more columns of a database table, one or more attributes of an object, one or more variables of a programmatic structure or any other unit of data of a data structure commonly known in the art.

As changes are made to the bitmap, the deltas are saved to store the changes in the manner described herein. FIG. 6 illustrates three deltas 604, 606, and 608. Based on a threshold event that may be predetermined, another full bitmap 610 may be generated and stored. The full bitmap 610 may be followed by delta bitmaps 620 and 622. The full bitmap 610 may be generated in response to predetermined events 630, which may include in the example shown, a threshold number of deltas, a percentage of the journal size or capacity, a fixed amount of space that may be predetermined, a shutdown or other event of the computing device, and upon request by the computing device, user, or other entity. Other events may also trigger the generation and storing of a full bitmap.

Figure 7:
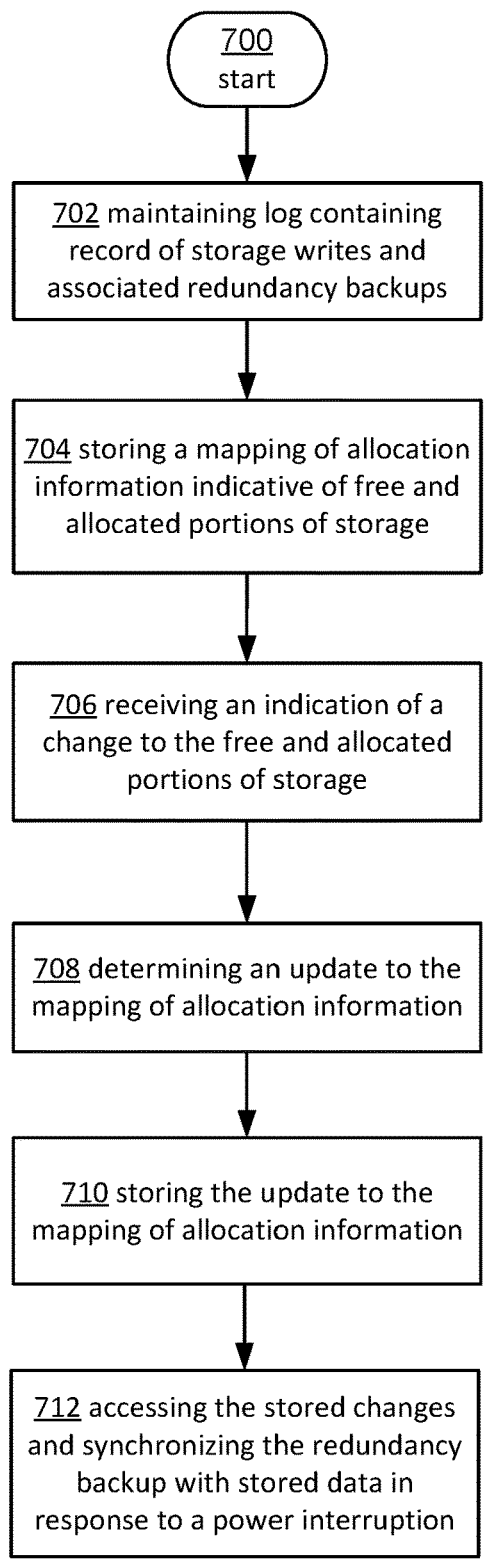
FIG. 7 is a diagram illustrating an example operational procedure, according to the described implementations.

Referring to FIG. 7, illustrated is an example operational procedure in accordance with the present disclosure. Referring to FIG. 7, Operation 700 begins the procedure. Operation 700 may be followed by Operation 702. Operation 702 illustrates maintaining a log containing a record of storage writes and associated redundancy backups. Operation 702 may be followed by Operation 704. Operation 704 illustrates storing, in the log, a mapping of allocation information indicative of free and allocated portions of storage. Operation 704 may be followed by Operation 706. Operation 706 illustrates receiving an indication of a change to the free and allocated portions of storage. Operation 706 may be followed by Operation 708. Operation 708 illustrates determining an update to the mapping of allocation information.

Operation 708 may be followed by operation 710. Operation 710 illustrates storing the update to the mapping of allocation information. Operation 710 may be followed by operation 712. Operation 712 illustrates accessing the stored changes and synchronizing the redundancy backup with stored data in response to a power interruption.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multi processor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the described methods are described herein as being implemented, at least in part, by system components, which can comprise an application, component and/or a circuit. In some configurations, the system components include a dynamically linked library (DLL), a statically linked library, functionality produced by an application programming interface (API), a compiled program, an interpreted program, a script or any other executable set of instructions. Data, such as the data associated with the work loads 102, 104 and/or 106, can be stored in a data structure in one or more memory components. Data can be retrieved from the data structure by addressing links or references to the data structure.

Although the following illustration refers to the components of FIG. 1-7, it can be appreciated that the operations of the described methods may be also implemented in many other ways. For example, the methods may be implemented, at least in part, by a processor of another remote computer or a local circuit. In addition, one or more of the operations of the methods may alternatively or additionally be implemented, at least in part, by a chips et working alone or in conjunction with other software modules. Any service, circuit or application suitable for providing the techniques disclosed herein can be used in operations described herein.

Figure 8:
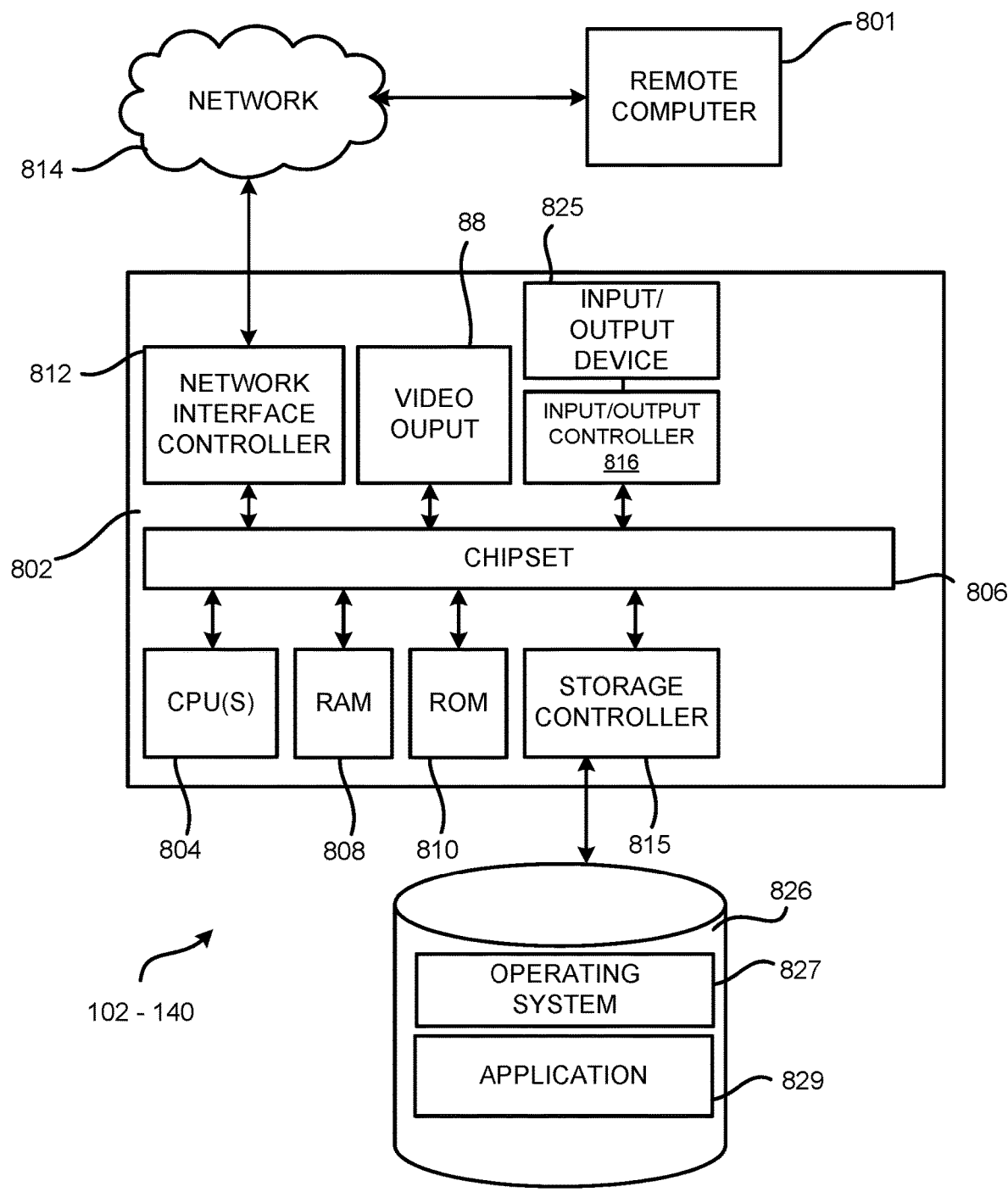
FIG. 8 is a computer architecture diagram illustrating a computing device architecture for a computing device capable of implementing aspects of the techniques and technologies presented herein.

FIG. 8 shows additional details of an example computer architecture capable of various aspects of the embodiments described above. The computer architecture shown in FIG. 8 illustrates aspects of a system, such as a conventional server computer, work station, desktop computer, laptop, tablet, computing or processing systems embedded in devices (such as wearable, automobiles, home automation etc.), or other computing device, and may be utilized to execute any of the software components presented herein. For example, the computer architecture shown in FIG. 8 may be utilized to execute any of the software components described above.

The computer architecture includes a baseboard 802, or "mother board," which is a printed circuit board to which a multitude of components or devices may be connected by way of a system bus or other electrical communication paths. In one illustrative embodiment, one or more central processing units ("CPUs") 804 operate in conjunction with a chips et 806. The CPUs 804 may be standard programmable processors that perform arithmetic and logical operations necessary for the operation of the computer architecture.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtracters, arithmetic logic units, floating-point units, and the like.

The chips et 806 provides an interface between the CPUs 804 and the remainder of the components and devices on the baseboard 802. The chips et 806 may provide an interface to a RAM 808, used as the main memory in the computer architecture. The chips et 806 may further provide an interface to a computer-readable storage medium such as a read-only memory ("ROM") 810 or non-volatile RAM ("NVRAM") for storing basic routines that help to startup the computing device and to transfer information between the various components and devices. The ROM 810 or NVRAM may also store other software components necessary for the operation of the computer architecture in accordance with the embodiments described herein.

The computer architecture may operate in a networked environment using logical connections to remote computing devices and computer systems through a network 814, such as the local area network. The chips et 806 may include functionality for providing network connectivity through a network interface controller (NIC) 812, such as a Gigabit Ethernet adapter. The NIC 812 is capable of connecting the computer architecture to other computing devices over the network 814. It should be appreciated that multiple NICKS 812 may be present in the computer architecture, connecting the computer to other types of networks and remote computer systems. The network allows the computer architecture to communicate with remote services and servers, such as the remote computer 801. As can be appreciated, the remote computer 801 may host a number of services such as the XBOX LIVE gaming service provided by MICROSOFT CORPORATION of Redmond, Wash. In addition, as described above, the remote computer 801 may mirror and reflect data stored on the computer architecture and host services that may provide data or processing for the techniques described herein.

The computer architecture may be connected to a mass storage device 826 that provides non-volatile storage for the computing device. The mass storage device 826 may store system programs, application programs, other program modules, and data, which have been described in greater detail herein. The mass storage device 826 may be connected to the computer architecture through a storage controller 815 connected to the chips et 806. The mass storage device 826 may consist of one or more physical storage units. The storage controller 815 may interface with the physical storage units through a serial attached SCSI ("SASS") interface, a serial advanced technology attachment ("SATA") interface, a fiber channel ("FC") interface, or other type of interface for physically connecting and transferring data between computers and physical storage units. It should also be appreciated that the mass storage device 826, other storage media and the storage controller 815 may include Multimedia card (MAC) components, eMMC components, Secure Digital (SD) components, PCI Express components, or the like.

The computer architecture may store data on the mass storage device 826 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 826 is characterized as primary or secondary storage, and the like.

For example, the computer architecture may store information to the mass storage device 826 by issuing instructions through the storage controller 815 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture may further read information from the mass storage device 826 by detecting the physical states or characteristics of one or more particular locations within the physical storage units.

In addition to the mass storage device 826 described above, the computer architecture may have access to other computer-readable media to store and retrieve information, such as program modules, data structures, or other data. As the operating system 827, the application 829, other data and other modules are depicted as data and software stored in the mass storage device 826, it should be appreciated that these components and/or other modules may be stored, at least in part, in other computer-readable storage media of the computer architecture. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture. For purposes of the claims, the phrase "computer storage medium," "computer-readable storage medium," and variations thereof, does not include waves or signals per se and/or communication media.

The mass storage device 826 may store an operating system 827 utilized to control the operation of the computer architecture. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 826 may store other system or application programs and data utilized by the computer architecture, such as any of the other software components and data described above. The mass storage device 826 might also store other programs and data not specifically identified herein.

In one embodiment, the mass storage device 826 or other computer-readable storage media is encoded with computer-executable instructions which, when loaded into the computer architecture, transform the computer from a general-purpose computing system into a special-purpose computer capable of implementing the embodiments described herein. These computer-executable instructions transform the computer architecture by specifying how the CPUs 804 transition between states, as described above. According to one embodiment, the computer architecture has access to computer-readable storage media storing computer-executable instructions which, when executed by the computer architecture, perform the various routines described above with regard to FIG. 8, and the other FIGURES. The computing device might also include computer-readable storage media for performing any of the other computer-implemented operations described herein.

The computer architecture may also include one or more input/output controllers 816 for receiving and processing input from a number of input devices, such as a keyboard, a mouse, a microphone, a headset, a touchpad, a touch screen, an electronic stylus, image processing and gesture recognition devices, or any other type of input device. The input/output controller 816 is in communication with an input/output device 825. The input/output controller 816 may provide output to a display, such as a computer monitor, a flat-panel display, a digital projector, a printer, a plotter, or other type of output device. The input/output controller 816 may provide input communication with other devices such as a microphone, a speaker, game controllers and/or audio devices.

For example, the input/output controller 816 can be an encoder and the input/output device 825 can include a full speaker system having a plurality of speakers. The encoder can use a spatialization technology, and the encoder can process audio output audio or output signals received from the application 88. The encoder can utilize a selected spatialization technology to generate a spatially encoded stream that appropriately renders to the input/output device 825.

The disclosure presented herein may be considered in view of the following clauses.

Example Clause A, a computer-implemented method for performing a memory operation in a computing system where a parity-based redundancy scheme is implemented, the method comprising:
  accessing allocation information indicative of free and allocated portions of storage;
  in response to a request for a write operation, when the write request shares its parity with a non-free portion of the storage:
    updating a record of writes to the storage to include the requested write and associated parity;
    updating the parity with the requested write; and
    allowing the write request to be executed;

when the write request shares its parity with a free portion of the storage or the write request spans all portions of storage that shares the parity:
   allowing the write request to be executed in the free portion of the storage without updating the record; and
   updating the parity based on the requested write without updating the record.

Example Clause B, the computer-implemented method of Example Clause A, wherein the allocation information is stored in the record.

Example Clause C, the computer-implemented method of any one of Example Clauses A through B, wherein updating a record comprises executing a flush to persistently store the update so that the requested write and associated parity can be recovered in response to an interruption of the requested write.

Example Clause D, the computer-implemented method of any one of Example Clauses A through C, wherein the parity comprises an exclusive-OR operation of data stored in two or more storage devices.

Example Clause E, the computer-implemented method of any one of Example Clauses A through D, further comprising in response to a power interruption, accessing the record and synchronizing the parity with stored data.

Example Clause F, the computer-implemented method of any one of Example Clauses A through E, wherein the method is implemented in a visualized computing environment, further comprising load balancing virtual machines to increase a likelihood that write requests are associated with parity that is shared with free portions of the storage.

Example Clause G, the computer-implemented method of any one of Example Clauses A through F, further comprising updating the allocation information stored in the record as free and allocated information becomes available.

Example Clause H, a computing device configured to implement a parity-based redundancy scheme, the computing device comprising:
   one or more processors;
   a memory in communication with the one or more processors, the memory having computer-readable instructions stored thereupon which, when executed by the one or more processors, cause the computing device perform operations comprising:
   in response to a request for a write operation that is determined to cause an update to a shared parity:
   updating a log with a record of the write operation and associated parity; and
   initiating the update to the parity and the requested write; and otherwise:
   allowing the write request to be executed without updating the log; and
   updating the parity based on the requested write without updating the log.

Example Clause I, the computing device of Example Clause H, wherein the determination to cause an update to the shared parity is based on the requested write being associated with unallocated portions of storage.

Example Clause J, the computing device of any one of Example Clauses H through I, wherein the determination is further based on storage allocation information.

Example Clause K, the computing device of any one of Example Clauses H through J, wherein the parity comprises an exclusive-OR of data stored on two or more storage devices.

Example Clause L, the computing device of any one of Example Clauses H through K, wherein updating the log comprises executing a flush to persistently store the update so that the requested write can be recovered in response to an interruption of the requested write.

Example Clause M, the computing device of any one of Example Clauses H through L, further comprising computer-readable instructions which, when executed by the one or more processors, cause the computing device perform operations comprising: in response to a power interruption, accessing the log and synchronizing the parity with stored data.

Example Clause N, the computing device of any one of Example Clause H through M, wherein the write operation does not cause an update to the parity based at least in part due to the parity being associated with free portions of storage.

Example Clause O, the computing device of any one of Example Clauses H through N, wherein an amount of data to be backed by the parity is configurable.

Example Clause P, the computing device of any one of Example Clauses H through O, wherein an additional amount of data is configured to be backed using a mirroring backup scheme.

Example Clause Q, a computer-readable storage medium having stored thereon computer-readable instructions stored thereupon which, when executed by one or more processors of a computing device, cause the computing device to perform operations comprising:
   prior to initiating a parity update associated with a write request, updating a log to record the write request and parity update when the write request shares its parity backup with a non-free portion of storage; and
   allowing the write request to be executed without updating the log when the write request shares its parity with an unallocated portion of storage Example Clause R, the computer-readable storage medium of Example Q, further comprising computer-readable instructions stored thereupon which, when executed by the one or more processors of the computing device, cause the computing device to perform operations comprising:
   in response to an interruption to execution of the write request, accessing the log to determine if the write request should be replayed.

Example Clause S, the computer-readable storage medium of any one of Example Q through R, wherein the write request is further allowed to be executed without updating the log when the write request spans all portions of storage that shares the parity.

Example Clause T, the computer-readable storage medium of any one of Example Clauses Q through S, further comprising determining that the write request has a parity backup associated with an allocated portion of storage based at least in part on storage allocation information.

Example Clause U, A computer-implemented method for performing a memory operation in a computing system where a redundancy backup is implemented, the method comprising:
   maintaining a log containing a record of storage writes and associated redundancy backups;
   storing, in the log, a mapping of allocation information indicative of free and allocated portions of storage;
   receiving an indication of a change to the free and allocated portions of storage;
   determining an update to the mapping of allocation information;
   storing the update to the mapping of allocation information; and accessing the stored update and synchronizing the redundancy backup with stored data in response to a power interruption.

Example Clause V, the computer-implemented method of Example Clause U, wherein the indication is received in response to a request for a write operation.

Example Clause W, the computer-implemented method of any of Example Clauses U through V, further comprising storing, in the log, data indicative of the write operation.

Example Clause X, the computer-implemented method of any of Example Clauses U through W, wherein when the write request is associated with a redundancy backup associated with a free portion of the storage, the write request is allowed to be executed without storing, in the log, data indicative of the write operation.

Example Clause Y, the computer-implemented method of any one of Example Clauses U through X, wherein the redundancy backup comprises a parity backup.

Example Clause Z, the computer-implemented method of any one of Example Clauses U through Y, wherein the parity backup comprises an exclusive-OR operation of data stored in two or more storage devices.

Example Clause AA, the computer-implemented method of any one of Example Clauses U through Z, further comprising storing a complete mapping of allocation information indicative of free and allocated portions of storage in response to a predetermined event.

Example Clause BB, a computing device configured to implement a parity-based redundancy scheme, the computing device comprising:
    one or more processors;
    a memory in communication with the one or more processors, the memory having computer-readable instructions stored thereupon which, when executed by the one or more processors, cause the computing device perform operations comprising:
    storing, in a log, a mapping of allocation information indicative of free and allocated portions of storage, the log containing a record of storage writes and associated parity backups;
    receiving an indication of an update to the free and allocated portions of storage;
    determining a representation of the update to the mapping of allocation information;
    storing the representation of the update to the mapping of allocation information; and accessing the stored mapping of allocation information and synchronizing the parity backup with stored data in response to a service interruption.

Example Clause CC, the computing device of Example Clause BB, further comprising computer-readable instructions stored thereupon which, when executed by the one or more processors, cause the computing device perform operations comprising: storing a complete mapping of allocation information indicative of free and allocated portions of storage in response to a predetermined event.

Example Clause DD, the computing device of any one of Example Clauses BB through CC, wherein the predetermined event comprises one or more of: a threshold number of updates, a threshold percentage of capacity of the log, a threshold amount of space, or a shutdown.

Example Clause EE, the computing device of any one of Example Clauses BB through DD, wherein the parity backup comprises an exclusive-OR of data stored on two or more storage devices.

Example Clause FF, the computing device of any one of Example Clauses BB through EE, wherein updating the log comprises executing a flush to persistently store the update so that interrupted writes can be recovered in response to an interruption of a requested write.

Example Clause GG, the computing device of any one of Example Clauses BB through FF, wherein the mapping comprises a bitmap.

Example Clause HH, the computing device of any one of Example Clauses BB through GG, wherein the representation of the update comprises an exclusive-OR of a current bitmap with an updated bitmap.

Example Clause II, the computing device of any one of Example Clauses BB through HH, wherein the representation is compressed prior to being stored.

Example Clause JJ, the computing device of any one of Example Clauses BB through II, wherein the indication is received in response to a request for a write operation, further comprising storing, in the log, data indicative of the write operation.

Example Clause KK, a computer-readable storage medium having stored thereon computer-readable instructions stored thereupon which, when executed by one or more processors of a computing device, cause the computing device to perform operations comprising:
    storing, in a log containing a record of storage writes and associated redundancy backups, a mapping of allocation information indicative of free and allocated portions of storage;
    receiving an indication of a change to the free and allocated portions of storage;
    determining an update to the mapping of allocation information;
    storing the update to the mapping of allocation information; and
    in response to a write request, accessing the stored update and determining, based on the updated mapping, whether to record the requested write.

Example Clause LL, the computer-readable storage medium of Example Clause KK, further comprising computer-readable instructions stored thereupon which, when executed by the one or more processors of the computing device, cause the computing device to perform operations comprising:
    determining that the write request has a redundancy backup associated with an allocated portion of storage based at least in part on the updated mapping.

Example Clause MM, the computer-readable storage medium of any one of Example Clauses KK through LL, further comprising computer-readable instructions stored thereupon which, when executed by the one or more processors of the computing device, cause the computing device to perform operations comprising:
    storing a complete mapping of allocation information indicative of free and allocated portions of storage in response to a predetermined event Example Clause NN, the computer-readable storage medium of any one of Example Clauses KK through MM, wherein the predetermined event comprises one or more of: a threshold number of updates, a threshold percentage of capacity of the log, a threshold amount of space, or a shutdown.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for performing a memory operation in a computing system where a parity-based redundancy scheme is implemented, the method comprising:
    accessing information indicative of a free portion of storage and of an allocated portion of the storage;
    in response to a request for a write operation, determining if the write operation is to be paired with the free portion of the storage or paired with the allocated portion of the storage when generating a parity;
    in an event the write operation is determined to be paired with the allocated portion of the storage;
        updating a record of writes to the free portion of the storage or the allocated portion of the storage to include a requested write;
        updating the parity with the requested write; and
        allowing the request for the write operation to be executed;
    in an event the write operation is determined to be paired with the free portion of the storage;
        allowing the request for the write operation to be executed in the free portion of the storage without updating the record of writes; and
        updating the parity based on the requested write without updating the record of writes.

2. The computer-implemented method of claim 1, wherein the information is stored in the record of writes.

3. The computer-implemented method of claim 1, wherein the updating the record of writes comprises executing a flush to persistently store an update so that the requested write and associated parity can be recovered in response to an interruption of the requested write.

4. The computer-implemented method of claim 3, wherein the parity comprises an exclusive-OR operation of data stored in two or more storage devices.

5. The computer-implemented method of claim 1, further comprising in response to a power interruption, accessing the record of writes and synchronizing the parity with stored data.

6. The computer-implemented method of claim 1, wherein the method is implemented in a virtualized computing environment.

7. The computer-implemented method of claim 2, further comprising updating the information stored in the record of writes as free and allocated information becomes available.

8. A computing device configured to implement a parity-based redundancy scheme, the computing device comprising:
    one or more processors;
    a memory in communication with the one or more processors, the memory having computer-readable instructions stored thereupon which, when executed by the one or more processors, cause the computing device perform operations comprising:

accessing information indicative of a free portion of storage and of an allocated portion of the storage;

in response to a request for a write operation, determining that the write operation is to be paired with the free portion of the storage rather than the allocated portion of the storage when generating a parity:

based on the write operation being determined to be paired with the free portion of the storage, allowing a write request to be executed in the free portion of the storage without updating a log; and updating the parity based on a requested write without updating the log.

9. The computing device of claim 8, wherein the parity comprises an exclusive-OR of data stored on two or more storage devices.

10. The computing device of claim 8, further comprising computer-readable instructions which, when executed by the one or more processors, cause the computing device perform operations comprising: in response to a power interruption, accessing the log and synchronizing the parity with stored data.

11. The computing device of claim 8, wherein the write operation does not cause an update to the parity based at least in part due to the parity being associated with free portions of storage.

12. The computing device of claim 8, wherein an amount of data to be backed by the parity of a parity function is configurable.

13. The computing device of claim 12, wherein an additional amount of data is configured to be back up using a mirroring backup scheme.

14. A non-transitory computer-readable storage medium having stored thereon computer-readable instructions stored thereupon which, when executed by one or more processors of a computing device, cause the computing device to perform operations comprising:

accessing information indicative of a free portion of storage and of an allocated portion of the storage;

in response to a request for a write operation, determining that the write operation is to be paired with the free portion of the storage rather than the allocated portion of the storage when generating a parity:

based on the write operation being determined to be paired with the free portion of the storage, allowing a write request to be executed in the free portion of the storage without updating a log; and updating the parity based on a requested write without updating the log.

15. The non-transitory computer-readable storage medium of claim 14, further comprising computer-readable instructions stored thereupon which, when executed by the one or more processors of the computing device, cause the computing device to perform operations comprising:

in response to an interruption to execution of the write request, accessing the log to determine if the write request should be replayed.

16. The non-transitory computer-readable storage medium of claim 14, wherein the write request is further allowed to be executed without updating the log when the write request spans all portions of storage that shares the parity.

17. The non-transitory computer-readable storage medium of claim 15, further comprising determining that the write request has a parity backup associated with an allocated portion of storage based at least in part on storage allocation information.

* * * * *

UNITED STATES PATENT AND TRADEMARK OFFICE
CERTIFICATE OF CORRECTION

PATENT NO. : 10,664,346 B2
APPLICATION NO. : 15/984135
DATED : May 26, 2020
INVENTOR(S) : Karan Mehra and Sachin Patel Page 1 of 2

It is certified that error appears in the above-identified patent and that said Letters Patent is hereby corrected as shown below:

In the Claims (Claim 1) Column 18, Lines 26-35, delete:
"in an event the write operation is determined to be paired with the allocated portion of the storage;
updating a record of writes to the free portion of the storage or the allocated portion of the storage to include a requested write;
updating the parity with the requested write; and
allowing the request for the write operation to be executed;
in an event the write operation is determined to be paired with the free portion of the storage;"

And insert:
--in an event the write operation is determined to be paired with the allocated portion of the storage:
updating a record of writes to the free portion of the storage or the allocated portion of the storage to include a requested write;
updating the parity with the requested write; and
allowing the request for the write operation to be executed;
in an event the write operation is determined to be paired with the free portion of the storage:--

(Claim 8) Column 18, Lines 65-67 through Column 19, Lines 1-8, delete:
"a memory in communication with the one or more processors, the memory having computer-readable instructions stored thereupon which, when executed by the one or more processors, cause the computing device perform operations comprising:
accessing information indicative of a free portion of storage and of an allocated portion of the storage;
in response to a request for a write operation, determining that the write operation is to be paired with the free portion of the storage rather than the allocated portion of the storage when generating a parity:"

Signed and Sealed this
Third Day of November, 2020

Andrei Iancu
*Director of the United States Patent and Trademark Office*

And insert:
--a memory in communication with the one or more processors, the memory having computer-readable instructions stored thereupon which, when executed by the one or more processors, cause the computing device to perform operations comprising:

accessing information indicative of a free portion of storage and of an allocated portion of the storage;

in response to a request for a write operation, determining that the write operation is to be paired with the free portion of the storage rather than the allocated portion of the storage when generating a parity;--

(Claim 10) Column 19, Lines 18-23, delete:
"The computing device of claim 8, further comprising computer-readable instructions which, when executed by the one or more processors, cause the computing device perform operations comprising: in response to a power interruption, accessing the log and synchronizing the parity with stored data."

And insert:
--The computing device of claim 8, further comprising computer-readable instructions which, when executed by the one or more processors, cause the computing device to perform operations comprising: in response to a power interruption, accessing the log and synchronizing the parity with stored data.--

(Claim 14) Column 20, Lines 6-9, delete:
    "in response to a request for a write operation, determining that the write operation is to be paired with the free portion of the storage rather than the allocated portion of the storage when generating a parity:"

And insert:
    --in response to a request for a write operation, determining that the write operation is to be paired with the free portion of the storage rather than the allocated portion of the storage when generating a parity;--